(No Model.)

E. R. HELBIG.
NAIL AND CORN TRIMMER.

No. 593,524.  Patented Nov. 9, 1897.

WITNESSES:
Bruno von Bittingshoven
Geo. W. Jackel

INVENTOR
Ernst Robert Helbig
BY
Joquel Raegener
ATTORNEYS.

THE NORRIS PETERS CO., PHOTO-LITHO., WASHINGTON, D. C.

UNITED STATES PATENT OFFICE.

ERNST ROBERT HELBIG, OF NEW YORK, N. Y.

NAIL AND CORN TRIMMER.

SPECIFICATION forming part of Letters Patent No. 593,524, dated November 9, 1897.

Application filed February 11, 1897. Serial No. 622,932. (No model.)

*To all whom it may concern:*

Be it known that I, ERNST ROBERT HELBIG, a citizen of the United States, residing in the city, county, and State of New York, have invented certain new and useful Improvements in Nail and Corn Trimmers, of which the following is a specification.

This invention relates to an improvement in devices for trimming, filing, and scraping finger-nails and corns.

My invention consists of a combined nail and corn trimmer provided with a body portion having an inclined portion, an opening at each end, the edges of which opening are beveled and sharpened and adapted to trim nails and corns.

My invention further consists of the features of construction hereinafter described, and defined in the claims.

Figure 1:
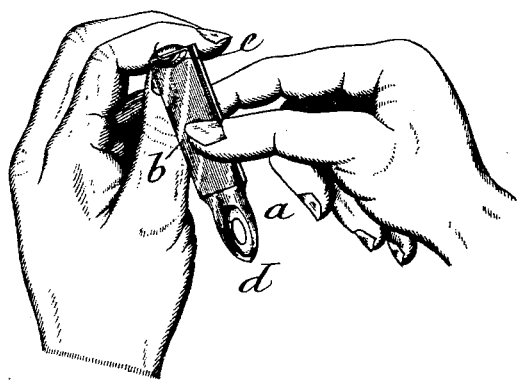
Figure 2:
Figure 3:
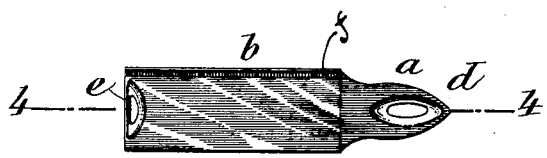
Figure 4:
Figure 5:
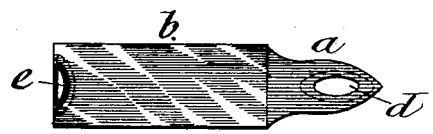
Figure 6:

Referring to the drawings, Figure 1 is a perspective view showing the implement in use as a nail-trimmer. Fig. 2 is a perspective view showing the implement used as a corn-trimmer. Fig. 3 is a front elevation. Fig. 4 is a section on line 4 4 of Fig. 3. Fig. 5 is an elevation of the reverse side. Fig. 6 is a sectional view of a detail.

Similar letters of reference indicate corresponding parts.

The improved nail and corn trimmer A is constructed of a single piece of steel, highly tempered and finished, and has a tapering portion $a$, that is bent up at an obtuse angle of inclination to the body portion C. The inclined portion $a$ is finished in an oval shape, and its edges provide a convenient and effective instrument for cleaning the nails. An elongated slot $d$ is formed in the inclined portion of the implement, and the edges of said slot are beveled and sharpened from one side only, thus leaving the under side smooth and flush. The opposite end of the body portion is squared and is also provided with a segmental slot $e$ near the blunt edge, as shown in Fig. 3. The curved edge of this slot $e$ is beveled and sharpened from one side with a deep bevel and on the under side with a shallow bevel, thus forming a large and small opening for large and small nails, while the straight edge of the slot remains blunt. A file-groove $f$ is provided along one edge of the body portion, as shown in Fig. 3.

The inclination of the tapering portion $a$ facilitates the handling of the implement in applying it to corns and permits a quick planing action to be exerted on the same by the sharp edges of the elongated slot.

For trimming nails the instrument is held, as shown in Fig. 1, with the nail in the transverse segmental slot $e$. By imparting a to-and-fro motion to the implement small shavings are produced and the nail trimmed as desired.

For trimming corns, removing rough skin, &c., the instrument is held in a slanting position, as shown in Fig. 2, and the elongated slot of the point $a$ drawn back and forth over the corn, whereby it will easily remove the object without the least pain.

My improved device provides a simple, economical, and effective implement for the purpose. Its peculiar shape protects the fingers and toes from injury, while the beveling also prevents the cutting edges from getting dull, as they are protected by the metallic structure.

Having thus described my invention, what I claim is—

1. A combined nail and corn trimmer consisting of a body portion having at one end a segmental slot with its curved edge beveled and sharpened and an inclined tapered portion at the opposite end, said tapered portion being provided with an elongated slot having beveled and sharpened edges, substantially as set forth.

2. A combined nail and corn trimmer consisting of a body portion having at one end a segmental slot, the curved edge of which is sharpened and provided with a deep bevel on one side and a shallow bevel on the other side and an inclined tapered portion at the opposite end, said tapered portion being provided with an elongated slot having beveled and sharpened edges, substantially as set forth.

In testimony that I claim the foregoing as my invention I have signed my name in presence of two subscribing witnesses.

E. ROBERT HELBIG.

Witnesses:
 PAUL GOEPEL,
 GEO. W. JAEKEL.